H. V. LOUGH.
TIRE SHAPING MACHINE.
APPLICATION FILED AUG. 31, 1920.

1,418,662.

Patented June 6, 1922.
2 SHEETS—SHEET 1.

Inventor.
Hector V. Lough,
By his Attorney.
Ernest Hopkinson

H. V. LOUGH.
TIRE SHAPING MACHINE.
APPLICATION FILED AUG. 31, 1920.
1,418,662.
Patented June 6, 1922.
2 SHEETS—SHEET 2.
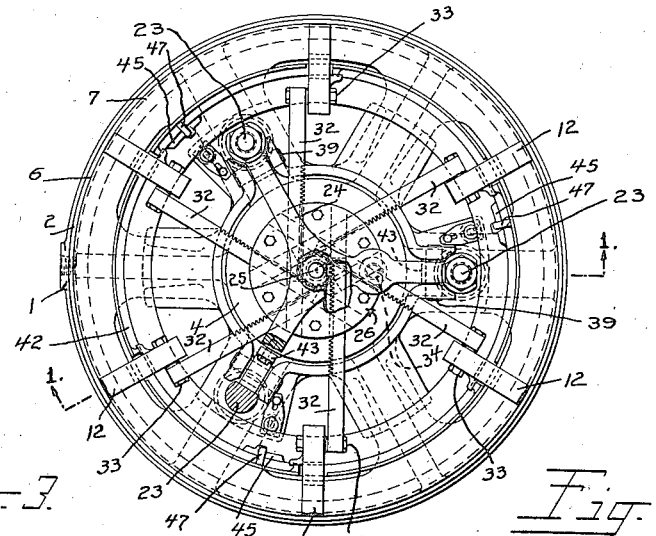
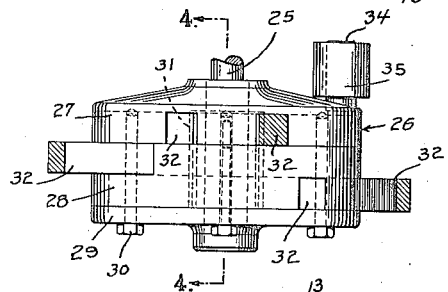
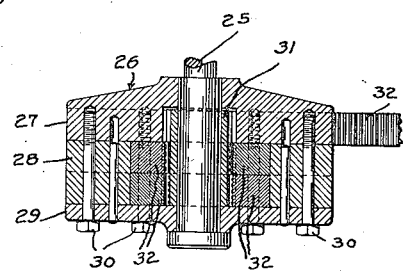
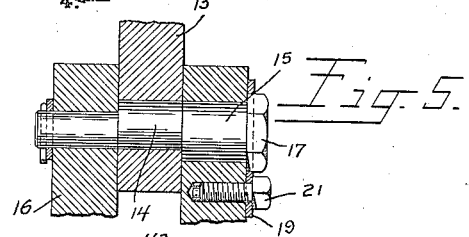
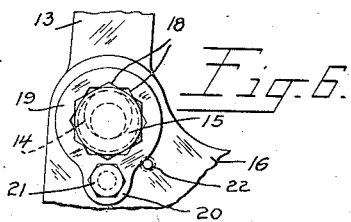
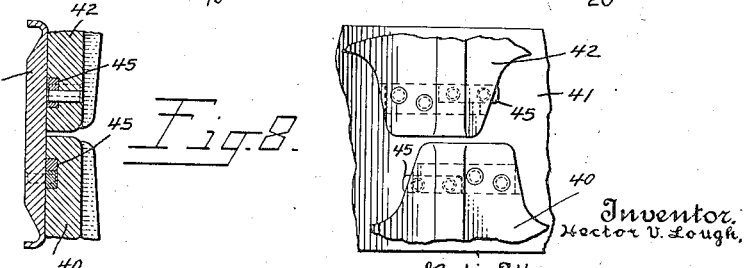
Inventor.
Hector V. Lough,
By his Attorney.
Ernest Hopkinson

UNITED STATES PATENT OFFICE.

HECTOR V. LOUGH, OF HARTFORD, CONNECTICUT, ASSIGNOR TO THE HARTFORD RUBBER WORKS COMPANY, A CORPORATION OF CONNECTICUT.

TIRE-SHAPING MACHINE.

1,418,662. Specification of Letters Patent. Patented June 6, 1922.

Application filed August 31, 1920. Serial No. 407,082.

*To all whom it may concern:*

Be it known that I, HECTOR V. LOUGH, a subject of the King of Great Britain, residing at Hartford, county of Hartford, State of Connecticut, have invented new and useful Improvements in Tire-Shaping Machines, of which the following is a full, clear, and exact description.

This invention relates to tire building or forming machines and particularly to an improvement upon a type thereof disclosed in a pending application of Hector V. Lough and Ernest Hopkinson, Sr. No. 292,346, filed April 24, 1919.

A tire carcass in the form of an endless band is transformed to tire shape by moving an abutment ring engaging one edge of the band upwardly towards an oppositely disposed abutment ring held against vertical displacement by the hook-shaped ends of relatively long levers whose lower ends are pivoted near the floor level to the base of the machine. Between its edges or beads the band is simultaneously distended by a suitable agency such as an air bag.

The organized mechanism for accomplishing the above transformation of a flat pulley band into a horse-shoe shaped carcass roughly approximates in outside dimensions a cylinder of a diameter equal to a tire and in the old machine of a height of nearly six foot. The pulley band has to be lifted over the top of the machine and lowered into place mid-length thereof, and the shaped tire has to be raised and cleared of the machine after its transformation. Certain auxiliary drums also have to be similarly raised and lowered. The carcass and the drums are heavy, and the lifting operations are both time-consuming and exhausting on the operators. One object of the present invention is to reorganize the machine to reduce the overall height thereof and the consequent time and labor required to introduce and remove the work.

In the old machines the abutment levers were not steadied adjacent the head thereof and sidewise blows thereagainst, and owing to the remoteness of their base pivots, were liable to be bent or fractured or to injure associated parts. Another object of the invention is to prevent injury to the abutment levers or parts by bracing the levers at their upper extremities against displacement to a harmful extent.

The invention further aims to simplify manipulation of the abutment levers so that movement of any one will more reliably shift all of the levers in unison. It further aims to render the machine more accurate and reliable, and in general more efficient. An embodiment of the invention is illustrated in the drawings, in which:

Fig. 2 is a plan view looking down on top of the machine.

Fig. 3 is a side elevation of a rack and housing by which unisonal movement of abutment levers is effected.

Fig. 4 is a cross section on the line 4—4 Fig. 3.

Figs. 5 and 6 are a section and elevation respectively of an adjustable pivotal support for each of the abutment levers.

Figure 1:
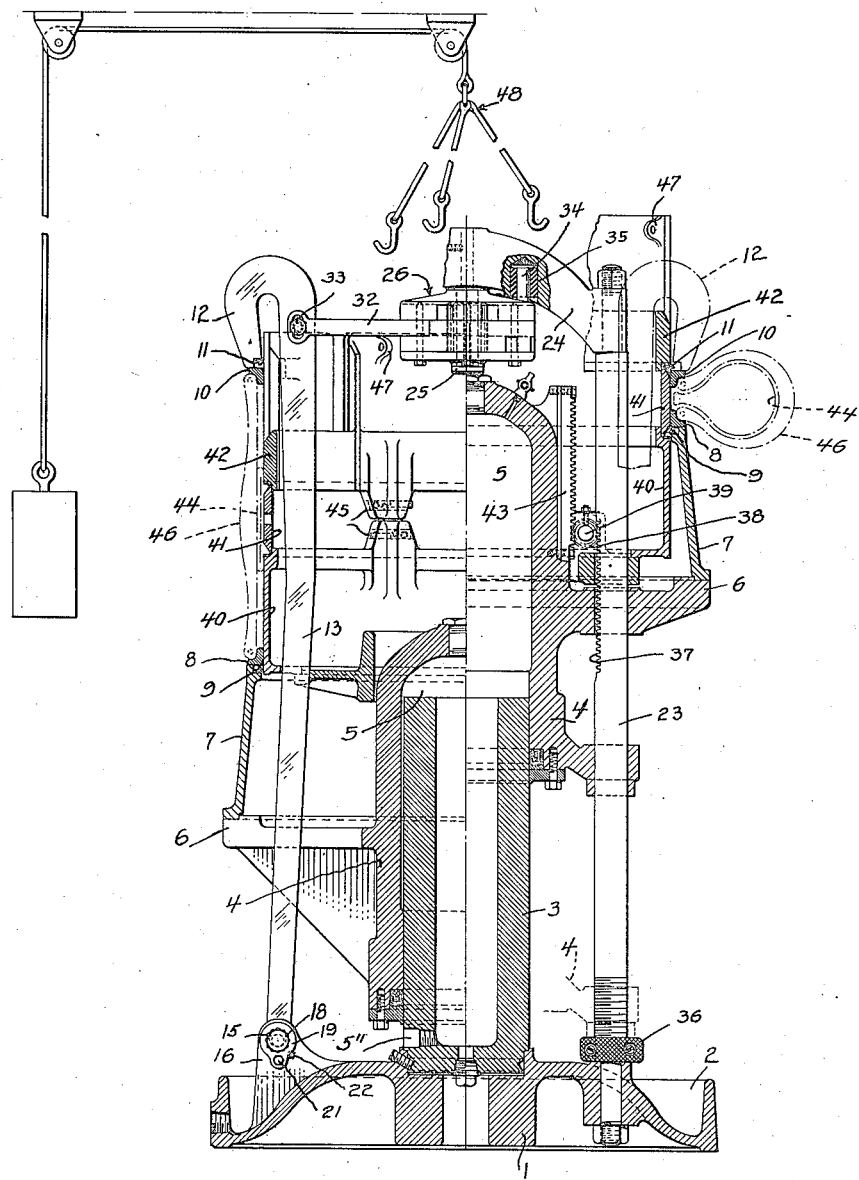
Fig. 1 is a vertical section on the line 1—1, Fig. 2, showing at opposite halves the relative positions of parts at the beginning and ending of a forming operation.

And Figs. 7 and 8 are a section and elevation respectively of an interlocking connection between drums.

The embodiment of the invention illustrated in the drawings is constructed in general the same as the machine illustrated in the beforementioned pending application of Hector V. Lough and Ernest Hopkinson. The old features in the machine of the present invention will be described along with the new features and reference may be made to said pending application, for a fuller understanding of the old details of construction.

From a base 1 having a drip catching groove 2 rises a column or post 3 which slidably supports a ram 4, the latter being operable by fluid introduced into and removed from the space 5 through a suitable port indicated at 5″. Laterally of the ram 4 extends a circular flange 6 which peripherally supports a drum 7 that is adapted by its upper edges to actuate an abutment ring 8 and its split or clamping ring 9, the drum 7 being interchangeable to suit various sizes of tires.

A second abutment ring 10 and its split and clamping ring 11 are adapted to be engaged by the hooked extremity 12 of each of a plurality of abutment levers 13 that are pivoted on the eccentric portion 14 (Fig. 5) of a pin 15 whose concentric portions are adjustably supported in the lugs 16 integral with the base 1, the adjustment mentioned being provided by shaping one end of the pin 15 in the form of a hexagon as indicated at 17 for reception in any of the twelve seats provided by the notches 18 (Fig. 6) in a washer 19 which has an extension 20 apertured to receive a bolt 21 to hold the washer 19 fixed. A second tapped opening 22 provided at 45° from the first and relative to the axis of the pin 15 affords another dozen positions of adjustment. Through this mechanism the several abutment levers 13 may be variously adjusted to bring their extremities which engage the abutment ring 10 into one of the same plane.

A plurality of stanchions 23 (Fig. 1) are bolted to the base 1 and to a triple armed yoke 24 adjacent the free extremities of the abutment levers. Centrally from the yoke 24 depends a headed rod 25 which loosely carries a housing indicated generally by the numeral 26. The housing (Figs. 3 and 4) consists of three disks 27, 28 and 29 which are suitably bolted together as indicated at 30 and cut away to receive a pinion 31 coaxial with the rod 25 and a plurality of racks 32 in engagement with the pinion. The racks 32 in pairs engage pinion 31 at diametrically opposite points and are arranged in pairs for operation in three parallel planes so as to clear one another. Each rack 32 is loosely articulated to an abutment lever as indicated at 33 to permit limited play. By this construction when any one of the several abutment levers 13 is shifted manually all will move therewith in unison.

Eccentrically of the housing 26 is a pin 34 which enters a rubber bushing 35 that is socketed in the yoke 24. By this means when any one of the abutment levers 13 is struck a sidewise blow, limited angular displacement about the axis of the rod 25 is permitted and the blow cushioned, the housing 26 turning slightly on the rod 25 to permit of this action.

At their lower extremities each of the stanchions 25 is threaded part way up and provided with a nut 36 which may be positioned at various elevations to limit the extent of downward movement of the ram 4, as indicated in dotted lines at the lower right of Fig. 1. This facilitates centering the carcass before pneumatic distension and saves unnecessary motion of the ram.

As in the construction of the before-mentioned pending application of Lough and Hopkinson, each of the stanchions is provided with a rack 37 that is engaged by a pinion 38 on a shaft 39 fixed to the lower of three stacked bands 40, 41 and 42, a second rack 43 being fixed to the ram 4. Through this mechanism the intermediate band 41 is moved upwardly simultaneously with, but at half the speed of the lower abutment ring 8 when the arm 4 is shifted to bring the lower abutment ring 8 towards the upper abutment ring 10.

The operation of the machine is in general the same as in the said pending application. The split or retaining ring 9 and lower abutment ring 8 are successively dropped over the band or telescoping drum 40. Then the band 41 with a deflated air bag 44 is stacked upon the lower band and the upper section 42 positioned upon it. The upper and lower sections 40 and 42 are then locked to the intermediate section 41 by a slight rotation and through a species of pin and slot connection indicated at 45, the latter being provided in lugs formed integral with the bands or sections and reinforced at the points of wear with hardened steel inserts. Then the flat pulley band 46 is positioned as indicated in the drawings and the upper abutment ring 10 and its retaining ring 11 arranged above the upper edge of the pulley band.

The abutment levers 13, which during the preceding operations have been retracted to an unobstructing position, are then advanced to the position shown at the left of Fig. 1. When fluid under pressure is now admitted to raise the ram 4 the drum 7 raises the lower abutment ring 8 and brings one edge of the tire carcass towards the other which is held by the upper abutment ring 10 and the relatively fixed abutment formed by the several free ends of the levers 13. Simultaneously with this action the air bag 44 is gradually inflated to bulge out the intermediate portion of the carcass. When the tire reaches the shape illustrated at the right of Fig. 1 the retaining rings 9 and 11 snap within channels in the intermediate drum 41 and the tire thus shaped is ready to be removed for subsequent treatment.

The removal of the finished tire is effected by first pushing inwardly on one of the abutment levers 13, whereupon all are moved inwardly clear of the upper internal drum 42. This latter is then lifted through its apertured ears 47 and a counter-balanced hoist indicated at 48. Then the tire on the intermediate drum 41 is bodily lifted clear of the machine and the cycle of operations completed.

From the foregoing description of the apparatus it will be clear that by disposing the abutment lever retracting mechanism below the plane of their tops, or more specifically, below the yoke 24, the overall height of the machine is considerably reduced. In an actual construction about a foot has been taken off. This of course saves very considerable labor and time in the manipulation of the machine. The specific construction for insuring unisonal retraction of the abutment levers effects a further saving in time and is much less laborious than the sliding collar and links mounted above the head as in the old machine.

While in the foregoing the preferred embodiment of the invention is disclosed, it will be understood that various changes may be made in details without departing from the principles underlying the invention and therefore reference should be made to the appended claims for an understanding of its scope.

Having thus described my invention, what I claim and desire to protect by Letters Patent is:

1. A tire forming machine having means for shaping a carcass from a substantially flat band into substantially tire form including telescoping drums and abutment members shiftable to clear the drums for convenience in introducing and removing a tire carcass, in combination with means below the tops of the abutment members for simultaneously shifting them.

2. A tire forming machine having means for shaping a carcass from a substantially flat band into substantially tire form including telescoping drums and abutment members shiftable to clear the drums for convenience in introducing and removing a tire carcass, in combination with racks articulated to each of said abutment members and a pinion intermeshing with said racks for operating them in unison.

3. A tire forming machine having means for shaping a carcass from a substantially flat band into substantially tire form including telescoping drums and abutment members shiftable to clear the drums for convenience in introducing and removing a tire carcass, in combination with substantially horizontally arranged racks loosely articulated to each of said abutment members, and a pinion intermeshing with said racks for insuring simultaneous shifting of the abutment levers.

4. A tire forming machine having means for shaping a carcass from a substantially flat band into substantially tire form including telescoping drums and abutment members shiftable to clear the drums for convenience in introducing and removing a tire carcass, in combination with racks below the tops of the abutment members and loosely pinned to each, and a pinion for permitting manual shift of any one of the members to shift the others in unison and equally therewith.

5. A tire forming machine having means for shaping a carcass from a substantially flat band into substantially tire form including telescoping drums and abutment members shiftable to clear the drums for convenience in introducing and removing a tire carcass, in combination with racks articulated to each of said abutment members and a pinion intermeshing with said racks for operating them in unison, and means for supporting said racks and pinion in substantially fixed planes relative to said holding members to permit limited angular displacement of said arms about the axis of the pinion.

6. A tire forming machine having means for shaping a carcass from a substantially flat band into substantially tire form including telescoping drums and abutment members shiftable to clear the drums for convenience in introducing and removing a tire carcass, in combination with racks articulated to each of said abutment members and a pinion intermeshing with said racks for operating them in unison, a housing for said racks and pinions, a support for said housing located interiorly of the abutment members, and means yieldingly resisting rotation of the racks about the axis of said support whereby accidental blows sidewise against the abutment members are cushioned.

7. A tire forming machine having in combination, a base, a plurality of abutment levers articulated to said base, a plurality of stanchions fixed to said base, a yoke secured to the stanchions at their upper ends, a housing centrally supported by said yoke and located within the upper free ends of said abutment levers, a pinion in said housing, racks engaging with said pinion operatively sustained in pairs in superposed planes by said housing, connections operatively securing each of said racks to one of the abutment levers, a pin mounted eccentrically on said housing, a cushion fixed to said yoke and receiving said pin, and means cooperating with said abutment lever for bringing the edges of a carcass together while transforming it from a cylindrical to a tire form.

8. A tire forming machine having in combination means for shaping a carcass from a substantially flat band into substantially tire form including telescoping drums and abutment members shiftable to clear the drums for convenience in introducing and removing a tire carcass, each of said abutment members having a pivotal support in the form of an eccentric, and means for holding the eccentric in different positions.

Signed at Hartford, Connecticut, this 27th day of August, 1920.

HECTOR V. LOUGH.